United States Patent
Knuebel

(10) Patent No.: US 11,035,801 B2
(45) Date of Patent: Jun. 15, 2021

(54) METHOD AND DEVICE FOR COMPUTER-ASSISTED DETERMINATION OF A HAIR COLOURING OUTCOME

(71) Applicant: Henkel AG & Co. KGaA, Duesseldorf (DE)

(72) Inventor: Hans Georg Knuebel, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 16/628,853

(22) PCT Filed: Jul. 2, 2018

(86) PCT No.: PCT/EP2018/067805
§ 371 (c)(1),
(2) Date: Jan. 6, 2020

(87) PCT Pub. No.: WO2019/007904
PCT Pub. Date: Jan. 10, 2019

(65) Prior Publication Data
US 2020/0225165 A1    Jul. 16, 2020

(30) Foreign Application Priority Data

Jul. 7, 2017 (DE) .................... 10 2017 211 599.8

(51) Int. Cl.
*A45D 44/00* (2006.01)
*G01N 21/84* (2006.01)
(Continued)

(52) U.S. Cl.
CPC ........... *G01N 21/84* (2013.01); *A45D 44/005* (2013.01); *G01N 21/33* (2013.01); *G01N 21/359* (2013.01);
(Continued)

(58) Field of Classification Search
CPC .... G01N 21/84; G01N 21/33; G01N 21/3563; G01N 21/359; G01N 2021/8444;
(Continued)

(56) References Cited

U.S. PATENT DOCUMENTS 6,067,504 A * 5/2000 MacFarlane ......... A45D 44/005
356/402
6,314,372 B1 * 11/2001 Macfarlane .......... A45D 44/005
356/402
(Continued)

FOREIGN PATENT DOCUMENTS

DE        60132192 T2    12/2008
DE    102015225459 A1     6/2017
(Continued)

OTHER PUBLICATIONS

EPO, International Search Report issued in International Application No. PCT/EP2018/067805, dated Oct. 15, 2018.

*Primary Examiner* — Mark R Gaworecki
(74) *Attorney, Agent, or Firm* — Lorenz & Kopf, LLP

(57) ABSTRACT

A method involves determining a first initial state parameter with information about prior damage to the hair and a second initial state parameter with information about a hair color. The method further involves determining the initial colour state of the hair to be dyed for the hair region and computer-assisted determination, for a particular hair dye, of a forecast hair colouring result for the hair in the hair region, taking into consideration the determined initial colour state of the hair.

12 Claims, 3 Drawing Sheets

(51) Int. Cl.
  *G01N 21/33* (2006.01)
  *G01N 21/3563* (2014.01)
  *G01N 21/359* (2014.01)
(52) U.S. Cl.
  CPC ... *G01N 21/3563* (2013.01); *A45D 2044/007* (2013.01); *G01N 2021/8444* (2013.01); *G01N 2201/0628* (2013.01)
(58) Field of Classification Search
  CPC .......... G01N 2201/0628; G01N 21/25; A45D 44/005; A45D 2044/007; A45D 2044/07
  USPC .................................................... 250/339.07
  See application file for complete search history.

(56) References Cited

U.S. PATENT DOCUMENTS

| | | | |
|---|---|---|---|
| 6,330,341 B1* | 12/2001 | Macfarlane | A45D 44/005 132/202 |
| 2002/0010556 A1 | 1/2002 | Marapane et al. | |
| 2005/0036677 A1* | 2/2005 | Ladjevardi | G16H 20/70 382/162 |
| 2005/0177032 A1* | 8/2005 | Grassinger | G01N 21/84 600/310 |
| 2006/0281994 A1 | 12/2006 | Miyamae et al. | |
| 2007/0100555 A1* | 5/2007 | Ladjevardi | G01N 21/84 702/1 |
| 2010/0139682 A1* | 6/2010 | Edgar | A45D 19/16 132/208 |
| 2014/0081148 A1* | 3/2014 | Heinrich | G01N 21/23 600/476 |
| 2014/0082854 A1* | 3/2014 | Landa | A45D 44/005 8/405 |
| 2014/0118521 A1* | 5/2014 | Conti | G01J 3/0264 348/77 |
| 2015/0089751 A1* | 4/2015 | Landa | B65D 1/0223 8/406 |
| 2016/0011051 A1* | 1/2016 | Conti | G01J 3/52 382/162 |
| 2016/0112616 A1* | 4/2016 | Bonifer | A45D 44/005 348/77 |
| 2017/0061640 A1* | 3/2017 | Lin | G06T 7/11 |
| 2017/0119130 A1* | 5/2017 | Witchell | A61B 5/0075 |
| 2017/0270679 A1* | 9/2017 | Koven | G01J 3/0264 |
| 2018/0357390 A1* | 12/2018 | Knuebel | G06Q 30/0281 |
| 2019/0183232 A1* | 6/2019 | Knuebel | A61B 5/448 |
| 2019/0192067 A1* | 6/2019 | Knuebel | A61B 5/1032 |
| 2019/0216387 A1* | 7/2019 | Knuebel | A61B 5/486 |
| 2019/0307392 A1* | 10/2019 | Knuebel | A61B 5/448 |

FOREIGN PATENT DOCUMENTS

| | | |
|---|---|---|
| EP | 1629775 A1 | 3/2006 |
| WO | 2017103056 A1 | 6/2017 |

* cited by examiner

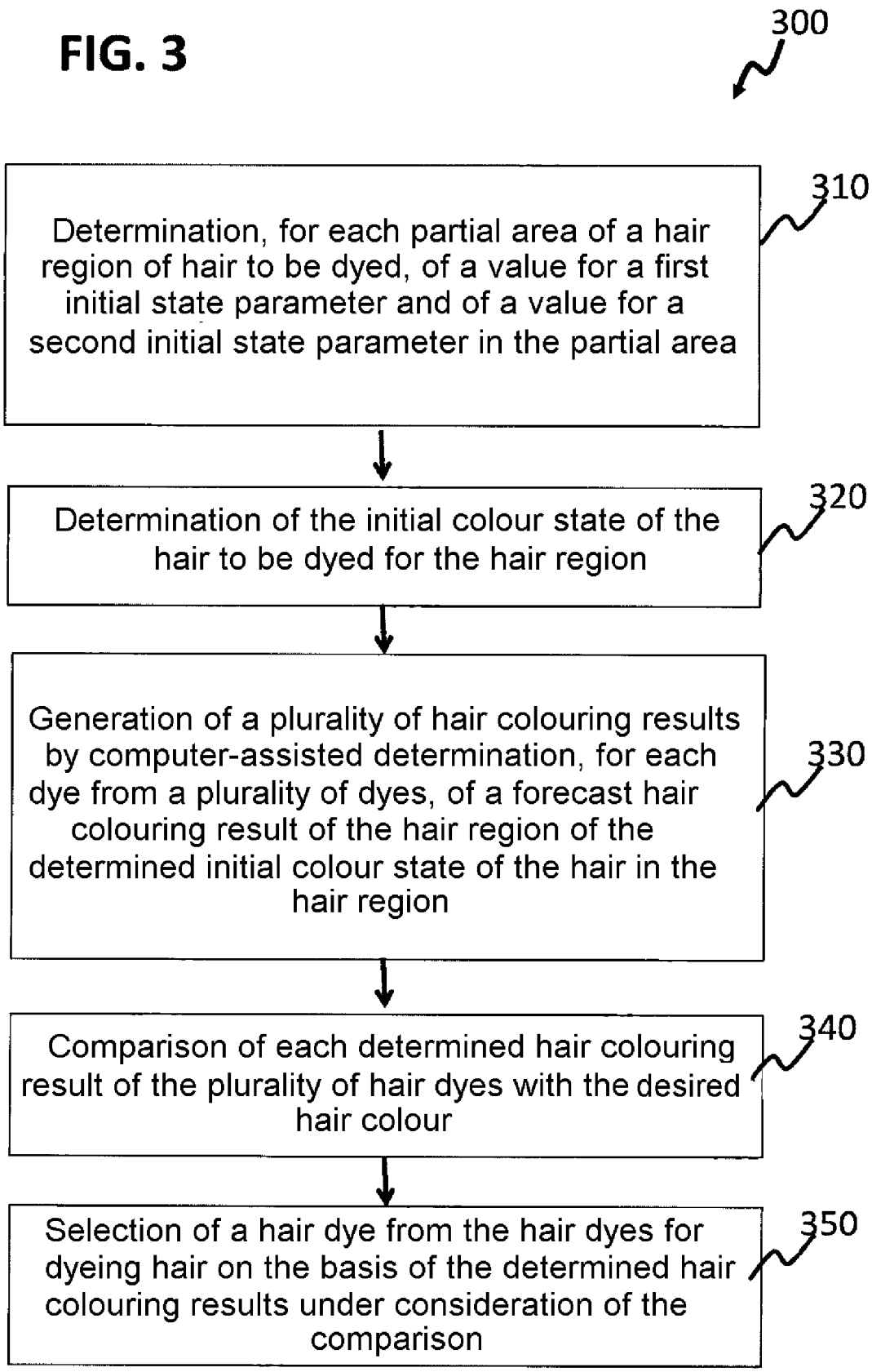

METHOD AND DEVICE FOR COMPUTER-ASSISTED DETERMINATION OF A HAIR COLOURING OUTCOME

CROSS-REFERENCE TO RELATED APPLICATION

This application is a U.S. National-Stage entry under 35 U.S.C. § 371 based on International Application No. PCT/EP2018/067805, filed Jul. 2, 2018, which was published under PCT Article 21(2) and which claims priority to German Application No. 10 2017 211 599.8, filed Jul. 7, 2017, which are all hereby incorporated in their entirety by reference.

TECHNICAL FIELD

The present disclosure relates to a method and a device for computer-assisted determination of a hair colouring result produced by a hair dye for dyeing hair.

BACKGROUND

When colouring hair using a dye, the intensity of the colouring may be highly dependent on an initial state of the hair which is to be dyed, for example a basic hair colour or a degree of damage to the hair. It is therefore very important to determine the initial state of the hair.

In conventional methods for determining a hair colouring result of a hair dye for dyeing hair of a user under consideration of the initial state of the hair, a hair sample from the user is generally used, which for example is taken next to, or at a certain distance from the scalp of the user. The hair sample usually comprises an individual hair or a plurality of hairs. The hair of a user, however, generally has different initial states depending on the area of the hair from which the hair sample is taken. For example, the hair of a user at tips of the hair is often differently light, thick, smooth or damaged as compared to at the hairline and/or at a main portion of the hair and/or at strands of the hair, etc. For a user wishing to dye their hair, however, it is very important that the expected colouring result and the colouring result actually attained be the same across all the hair.

In conventional methods for determining initial state parameters, with no removal of a hair sample, the various initial state parameters of the hair are generally determined using separate devices. This has the disadvantage that the exact position of the specific, analysed hair region when determining the various parameters for the hair is lost, and therefore it is difficult to achieve an exact match between the position of the determination of a first initial state parameter and the position of the determination of a second initial state parameter in the same area.

BRIEF SUMMARY

In various exemplary embodiments a method is provided which takes into consideration an individual initial colour state, which is described by a plurality of initial state parameters, when determining a hair dyeing result of a hair dye for dyeing the hair. The method should, at the same time, enable the assignment of the plurality of initial state parameters to a specific, analysed area of the hair when determining the first initial state parameter and the second initial state parameter of the hair.

The method consists in determining, for each partial area of a hair region of hair to be dyed, a value for a first initial state parameter and a value for a second initial state parameter in the particular partial area. The first initial state parameter includes information regarding a hair state. The second initial state parameter includes information regarding a hair colour. The first initial state parameter and the second initial state parameter describe an initial colour state of the hair to be dyed in the partial area. The method further consists in determining the initial colour state of the hair to be dyed for the hair region. The first initial state parameters are summed for all partial areas of the hair region, and the second initial state parameters are summed for all partial areas of the hair region. The method further consists in computer-assisted determination, for a particular hair dye, of a forecast hair colouring result for the hair in the hair region, taking into consideration the determined initial colour state of the hair in the hair region.

The method enables a precise, spatially resolved assignment of the first initial state parameter and, at the same time, the second initial state parameter to a specific analysed hair partial area. A reliability of a prediction of a hair colouring result can thus be improved. This leads also to a reduced measurement outlay, since the first initial parameter and the second initial parameter are determined substantially simultaneously for each partial area of the hair region. This also enables lower costs, since the data regarding the first initial parameter and the second initial parameter are processed together by employing a joint execution of the determination of an initial colour state and of the computer-assisted determination.

In various exemplary embodiments the first initial state parameter is a degree of prior damage to the hair that is to be dyed.

In various exemplary embodiments the second initial state parameter is an initial hair colour of the hair that is to be dyed.

In various exemplary embodiments the determination of the degree of prior damage, during exposure of each partial area of the hair region to near-infrared and/or infrared light, includes recording, for each partial area, a spectrum of at least part of the near-infrared and/or infrared light which has interacted with each partial area of the hair region. The determination of the degree of prior damage also includes a comparison of at least part of the spectrum with a spectroscopic calibration model obtained using near-infrared and/or infrared spectra and degrees of prior damage from a plurality of calibration hair samples.

The determination of the degree of prior damage also includes a determination of the degree of prior damage for each partial area of the hair region of the hair that is to be coloured, under consideration of the aforesaid comparison.

In various exemplary embodiments the value for the first initial state parameter and the value for the second initial state parameter are determined by employing a common measuring device.

In various exemplary embodiments the computer-assisted determination of the forecast hair colouring result is performed by employing predictive analytics.

In various exemplary embodiments the method also comprises a step of displaying the hair colouring result.

In another aspect a device for determining a hair colouring result of a hair dye for dyeing hair is provided. The device comprises a data processing device for carrying out a computer-assisted determination of a hair colouring result of a hair dye for dyeing hair. The data processing device is designed in such a way as to carry out the above-described method for determining a hair colouring result of a hair dye for dyeing hair. The device also comprises a measuring device, which is designed to determine the value for the first initial state parameter and the value for the second initial state parameter for each partial area of the hair region of the hair that is to be dyed.

In various exemplary embodiments the measuring device detects wavelengths in a spectral range of from about 200 nm to about 25,000 nm, preferably from about 200 nm to about 2,500 nm and very particularly preferably from about 320 to about 2,500 nm.

In various exemplary embodiments the measuring device comprises a digital camera and/or an NIR/IR spectrometer.

In various exemplary embodiments the measuring device comprises a UV/VIS spectral photometer and/or an NIR/IR spectrometer.

In various exemplary embodiments the data processing device comprises a smartphone, a tablet or a laptop, smart mirror or another computer.

In various exemplary embodiments the device also has an output device for outputting information.

In yet a further aspect a method for specifying a hair dye for dyeing hair in a desired hair colour is provided. The method consists in determining, for each partial area of a hair region of hair to be dyed, a value for a first initial state parameter and a value for a second initial state parameter in the particular partial area. The first initial state parameter includes information regarding a hair state. The second initial state parameter includes information regarding a hair colour. The first initial state parameter and the second initial state parameter describe an initial colour state of the hair to be dyed in the partial area. The method further consists in determining the initial colour state of the hair to be dyed for the hair region. The method also consists in producing a plurality of hair colouring results by computer-assisted determination, for each hair dye from a plurality of hair dyes, or a predicted hair colouring result of the hair region with inclusion of the determined initial colouring state of the hair in the hair region. The method also comprises a comparison of each determined hair colouring result from the plurality of hair colouring results with the desired hair colour, and a choice of a hair dye from the hair dyes for dyeing hair on the basis of the determined hair colouring results with inclusion of the comparison.

In various exemplary embodiments the comparison of each determined hair colouring result from the produced plurality of hair colouring results includes a determination of a plurality of colour distances. Each colour distance from the plurality of colour distances is a colour distance between the desired hair colour and the determined hair colouring results for a hair dye from the plurality of hair dyes.

BRIEF DESCRIPTION OF THE DRAWINGS

The present disclosure will hereinafter be described in conjunction with the following drawing figures, wherein like numerals denote like elements, and:

FIG. 3 shows a flow chart showing a method for determining a colouring result for dyeing hair to a desired hair colour in accordance with various exemplary embodiments.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

Reference is made in the following detailed description to the accompanying drawings, which form part of the present application and in which specific embodiments in which the present disclosure can be carried out are shown by way of illustration. It goes without saying that other embodiments can be used and structural or logical changes can be made without departing from the scope of protection of the present disclosure. It goes without saying that the various exemplary embodiments described herein can be combined with one another unless specifically stated otherwise. The following detailed description therefore is not to be interpreted as limiting, and the scope of protection of the present disclosure is defined by the accompanying claims.

In the present description the terms "predictive analytics", "big data" and "data mining" are used synonymously.

In the present description the term near-infrared (NIR) is used for light with a wave number in a range of from about 12,820 (corresponds to approximately 780 nm) to about 4,000 cm-1 (corresponds to about 2,500 nm), and the term infrared (IR) is used for light with a wave number in a range of from about 3,999 to about 400 cm-1 (corresponds to about 25,000 nm). Light with a wavelength and a range of from about 10 to about 380 nm is referred to by the term UV, and visible light with a wavelength of from about 380 nm to about 780 nm is referred to by the term VIS.

Figure 1:
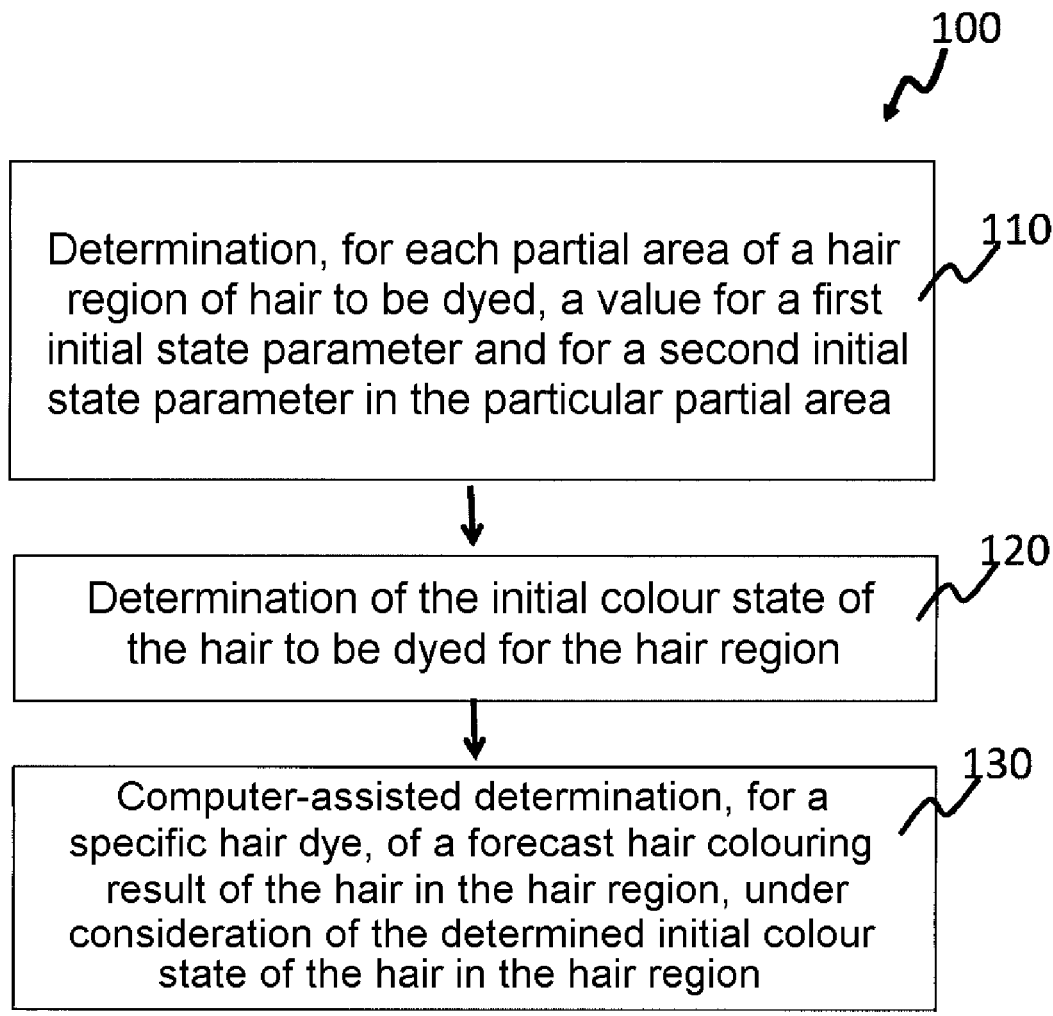
FIG. 1 shows a flow chart showing a method for determining colouring results of a dye for dyeing hair in accordance with various exemplary embodiments.

FIG. 1 shows a flow chart showing a method for determining a colouring result of a dye for dyeing hair in accordance with various exemplary embodiments.

The method 100 consists in determining 110, for each partial area of a hair region of hair to be dyed, a value for a first initial state parameter and a value for a second initial state parameter in the particular partial area. The first initial state parameter includes information regarding a hair state. The second initial state parameter includes information regarding a hair colour. The first initial state parameter and the second initial state parameter describe an initial colour state of the hair to be dyed in the partial area.

The method 100 further consists in determining 120 the initial colour state of the hair to be dyed for the hair region.

The method 100 further consists in computer-assisted determination 130, for a particular hair dye, of a forecast hair colouring result for the hair in the hair region, taking into consideration the determined initial colour state of the hair in the hair region.

The term "hair region" shall be understood herein to mean the sum of the partial areas, for example all of the hair of the user.

The first initial state parameter and the second initial state parameter are determined for each partial area of the hair region by determination of the first initial state parameter and the second initial state parameter for a first partial area, followed by determination of the first initial state parameter and the second initial state parameter for a second partial area, and so on until preferably the first initial state parameters and the second initial state parameters for the entire hair region have been determined.

The first initial state parameter and the second initial state parameter are determined for a partial area in such a way that the first initial state parameter and the second initial state parameter are determined or measured substantially simultaneously for the partial area. The expression "substantially simultaneously" means that the first initial state parameter and the second initial state parameter can be measured simultaneously or successively with a small time distance, for example less than a second, for example less than a tenth of a second, for example less than a hundredth of a second, such that the analysed partial area remains the same for both initial state parameters.

The method enables a precise, spatially resolved assignment of the first initial state parameter and, at the same time, the second initial state parameter to a specific analysed hair partial area. This leads also to a reduced measurement outlay, since the first initial parameter and the second initial parameter are determined substantially simultaneously for each partial area of the hair region. This also enables lower costs, since the data regarding the first initial parameter and the second initial parameter are processed together by employing a joint execution of the determination of an initial colour state and of the computer-assisted determination.

The term "partial area" within the scope of this description is used in the sense that it refers to an area of the hair which comprises hairs, wherein the hairs in the partial area are substantially identical or homogeneous to one another in respect of the hair colour or hair state. In addition, the term "partial area" within the scope of this description is defined in conjunction with the area content of an area of the hair visible from the measuring device.

In various exemplary embodiments a corresponding device is used to carry out the method for determining a colouring result of a dye for dyeing hair. The device will be described in greater detail further below, for example in FIG. 2 and associated description.

In various exemplary embodiments the value for the first initial state parameter and the value for the second initial state parameter are determined by employing a common measuring device, for example in an integrated unit. The device may be equipped for example with a signal-emitting arrangement, wherein the signal is triggered when the process of determining the first initial state parameter and the second initial state parameter for the partial area is complete and, as applicable, when the device for determining the first initial state parameter and the second initial state parameter is ready for another partial area.

In various exemplary embodiments the value for the first initial state parameter and the value for the second initial state parameter are determined by employing two measuring devices, which are situated in a common housing.

Generally, a hair state may include, for example, hair damage, hair thickness (otherwise expressed as head diameter), a chemical composition of the hair or a waviness of the hair. With regard to the chemical composition, this preferably relates to the content of one or more amino acid(s), in particular the content of one or more amino acid(s) chosen from the group including glycine, alanine, valine, isoleucine, leucine, phenylalanine, tyrosine, lysine, arginine, histidine, aspartic acid, glutamic acid, threonine, serine, glutamine, asparagine, methionine, cysteine, proline, tryptophan, cystine, ornithine, citrulline and mixtures thereof.

In various exemplary embodiments the first initial state parameter is the degree of damage of the hair prior to the dying, also referred to as a degree of prior damage of the hair to be dyed.

Hair can be damaged by natural or artificially induced processes. The most important type of damage may be oxidative damage in this context. The damaging process may be caused by an oxidation of amino acids, for example an oxidation of the amino acids cystine and cysteine, which are found very frequently in hair.

Cystine can form intermolecular disulphide bridges in the hair (also referred to as S-S Bridges), and therefore cystine is extremely important for the mechanical stability of the hair. The oxidation of these bridges to form cysteic acid may destroy the mechanical stability of the hair and, in the case of multiple applications, may even lead to a complete hair breakage.

In various exemplary embodiments a method that is easily executed is used, which enables the degree of oxidative damage of hair to be precisely determined with the aid of NIR spectroscopy and/or IR spectroscopy and multivariate calibration methods.

In various exemplary embodiments a near-infrared (NIR) and/or an infrared (IR) spectrum can be obtained, for example by employing ATR (near-)infrared spectroscopy (ATR=attenuated total reflection). By applying mathematical models, a mathematical model can be created by measuring calibration hair samples which have a cysteic acid content determined by way of a known analytical method, for example a determination of a cysteic acid content by employing high-performance liquid chromatography (HPLC), which mathematical model then allows a calculation of a content of cysteic acid, and thus prior hair damage, with the analysis of a partial area of the hair region of the user on the basis of the recorded NIR or IR spectrum. An analysis of the spectrum and an application of the model can be realised here for example (using suitable apps) by employing known smartphones, tablets, or the like.

The NIR spectroscopy may be suitable for measuring hair because with near-infrared radiation not only is the surface of the hair analysed, but, due to the small absorption cross-sections for the near-infrared radiation (for example compared with light in the visible wavelength range), the hair can be penetrated at least in part.

The determination of the value for the first initial state parameter may include a determination of the value for a degree of prior damage. The determination of the degree of prior damage, during exposure of each partial area of the hair region to near-infrared and/or infrared light, includes recording, for each partial area, a spectrum of at least part of the near-infrared and/or infrared light which has interacted with each partial area of the hair region. The determination of the value for the degree of prior damage also includes a comparison of at least part of the spectrum with a spectroscopic calibration model obtained by employing near-infrared and/or infrared spectra and degrees of prior damage from a plurality of calibration hair samples. The determination of the degree of prior damage also includes a determination of the degree of prior damage for each partial area of the hair region of the hair that is to be coloured, under consideration of the aforesaid comparison.

In various exemplary embodiments a calibration model can be created. The calibration model is created for example in such a way that a calibration spectrum of at least part of the near-infrared and/or infrared light is recorded for the plurality of calibration hair samples during exposure of the calibration hair sample to near-infrared and/or infrared light, and said calibration spectrum is reflected and/or scattered by the calibration hair sample. The degree of prior damage the calibration hair sample is then determined by employing an independent analytical method, for example high-performance liquid chromatography (HPLC). A degree of prior damage is assigned to the calibration spectrum, and a correlation between the plurality of calibration spectra and the plurality of degrees of prior damage is determined, for example by employing a partial least squares algorithm.

With the calibration model the concentration of the cysteic acid (as a measure for prior hair damage) can be calculated very easily from the spectra in comparison with the calibration spectra on the basis of an (N)IR spectrum obtained for a partial area of the hair region of the user. The calibration model may then allow the calculation of the cysteic acid concentration both if the measurement spectrum corresponds substantially to one of the calibration spectra (or variables determined from each of the spectra, for example a value for the absorption in the wavelength range characteristic for the cysteic acid, for example an equivalent width or the like, are substantially identical) and if the measurement spectrum or the variable determined therefrom would be arranged between two calibration spectra or beyond a calibration spectrum. In other words, the calibration model may be formed on the basis of the separate calibration spectra and the associated analytically determined cysteic acid concentration values as a continuous model which enables an interpolation and extrapolation of the separate data points.

In various exemplary embodiments a measured near-infrared (NIR) range can have wave numbers of from approximately 12,820 cm-1 to approximately 4,000 cm-1, or parts thereof.

In various exemplary embodiments and IR spectra of cystine in the wave number range of from approximately 6,200 cm-1 to approximately 5,500 cm-1 show characteristic absorption bands. If the hair changes, for example due to progressive damage (increase of the cysteic acid content), this may have an effect in the NIR spectrum on the bands at about 5,022 cm-1 to about 4,020 cm-1 characteristic for the cysteic acid.

Alternatively, the cysteic acid content can also be determined indirectly via a compound of which the content is correlated with the cysteic acid content. Such a compound is for example melanin, the content of which correlates inversely to the content of cysteic acid.

The melanin occurring in the hair absorbs not only in the visible spectrum (VIS), but also in the short-wave near-infrared spectrum, i.e. up to approximately 1300 nm. Without wishing to be bound this theory, it is supposed that there is additionally a formation of specific oxidation products of the melanin which also have absorptions in the short-wave NIR range.

It has been found that reliable calibration models, which produce a correlation between the short-wave near-infrared spectrum and the cysteine content and which have substantially the same quality can also be created with the aid of short-wave near-infrared spectra with a wave number range of from about 12,820 to about 7,692 cm-1 (from about 800 to about 1,300 nm), that is to say in a wave number range in which cysteic acid demonstrates no characteristic absorption.

In various exemplary embodiments the least one part of the near-infrared and/or infrared light can have a (infrared) wave number range ranging between about 12,820 and about 7,692 cm-1.

Alternatively, instead of the cysteic acid content, the content of degradation products of other amino acids created during oxidative damage can be used as a measure for the damage. Examples are the oxidation products of the amino acids tryptophan, methionine, tyrosine, histidine or lysine In various exemplary embodiments a smartphone, a tablet or a laptop can be used to carry out the method and/or in the device on the basis of a simple experimental implementation by use of new miniaturised NIR sensors and connection thereof to, or integration in, a mobile data processing device.

The miniaturised (N)IR spectrometer or (N)IR sensors can be provided in particular also in mobile form, for example in the form of hand-held spectrometers or add-on spectrometers.

An example of a suitable hand-held spectrometer is the "MicroNIR OnSite" by the company Viavi Solutions Inc. This spectrometer is powered and controlled from a tablet or a laptop via a USB connection and makes it possible to record the near-infrared and/or infrared spectra of the keratin fibres of an individual in real time with a measurement time of between about 0.25 and about 0.5 seconds. The spectrometer has two integrated tungsten vacuum lamps and an InGaAs photodiode array with about 128 pixels. The "MicroNIR OnSite" operates in a wave number range of from about 6,060 to about 10,526 cm-1. The distance between the keratin fibres and the glass of the hand-held spectrometer may be between 0 and about 15 mm, wherein a distance of about 3 mm is preferred.

In one embodiment the entire method for determining a hair colouring result is performed by the tablet or the laptop, which powers and controls the "MicroNIR OnSite" spectrometer. Alternatively, the obtained spectroscopic data can be sent to a further (mobile) data processing device, which then carries out the method for determining a hair colouring result. The spectroscopic data can be transmitted for example wirelessly by employing WLAN (WiFi) or Bluetooth.

A further suitable hand-held spectrometer is the "i-Spec Nano" from the company B&W Tek. The spectrometer is supplied with power via a USB connection and a (mobile) data processing device connected thereto, or via a battery. The spectrometer comprises a light source and operates in a wave number range of from about 4,545 to about 7,692 cm-1. The spectroscopic data can be transmitted to a (mobile) data processing device, which then performs the method for determining a hair colouring result, wirelessly, by employing WLAN (WiFi) or Bluetooth.

Also suitable is the "QualitySpec Trek" hand-held spectrometer from the company ASD Inc. this operates in a wave number range of from about 28,571 to about 400 cm-1.

A further suitable hand-held spectrometer is the "SCiO by Consumer Physics", which, with the aid of the integrated app "SpectroScan", displays the spectroscopic data on a smart end device. The hand-held spectrometer operates in the short-wave NIR range, more specifically at wave numbers of from about 9,090 to about 14,285 cm-1 (corresponds to from about 700 to about 1,100 nm). The measured data are evaluated with the aid of a cloud, in which for example there are stored a material database, chemometric models, and algorithms.

Further suitable hand-held spectrometers are obtainable from the company Attonics Systems and operate either in the wave number ranges of from about 9,090 to about 26,315 cm-1 (VIS-NIR) or from about 3,333 to about 10,000 cm-1 (NIR). These spectrometers are based on interferometers and have a high light throughput and a high spectral resolution (<5 nm for the VIS-NIR spectrometer and <20 nm for the NIR spectrometer). The spectrometers have a multi-phase shift array (MPA) chip and an optical arrangement in a circular tube. The spectrometers are also compatible with mobile data processing devices.

Further examples for VIS-NIR spectrometers are the miniature spectrometers "USB2000-VIS-NIR" and "USB4000-VIS-NIR" from the company Ocean Optics. This spectrometer operates with a wavelength range from about 350 to about 1000 nm. The spectrometers are connected to a data processing device via a USB connection.

A further suitable, miniaturised NIR spectrometer is integrated in the H2 smartphone from the company Changhong.

In addition, there are a series of NIR sensors or NIR evaluation modules which can be used in hand-held spectrometers. Suitable NIR evaluation modules are the modules "DLP® NIRscan" and "DLP® NIRscan Nano" from the company Texas Instruments. These have two tungsten lamps and InGaAs photodiodes as detectors. The module "DLP® NIRscan" operates in a wave number range of from about 4,016 to about 7,407 cm-1, and the module "DLP® NIRscan Nano" operates in a range of from about 5,882 to about 11,111 cm-1. The spectroscopic data are communicated wirelessly via Bluetooth Low Energy. With the aid of "Software Developer Kits" (SDK), for example the Open Source SDK from KST Technologies, apps can be developed which evaluate or further process the spectroscopic data.

Further suitable NIR sensors are obtainable under the name "NeoSpectra" from Si-Ware Systems. Specific sensors include: NeoSpectra SW62221-1.7, NeoSpectra SW62221-2.1 and NeoSpectra SW62221-2.5, which operate in different wavelength ranges (NeoSpectra SW62221-1.7=from about 1,250 to about 1,700 nm, NeoSpectra SW62221-2.1=from about 1,300 to about 2,100 nm and NeoSpectra SW62221-2.5=from about 1,350 nm to about 2,500 nm) The sensors combine Fourier-Transform (near-)infrared spectroscopy (FT-IR) with microelectromechanical systems (MEMS). The NIR sensors have a monolithic MEMS Michelson Interferometer Chip and a InGaAs photodetector.

Generally, information regarding a hair colour may include, for example, a hair colour, a washing fastness, a light fastness, and/or grey coverage. The hair colour can be produced by dyeing hair with a dye, also referred to as a colouring process.

A "colour" can be understood herein to mean the combination of a shade (i.e. of a spectral colour impression, also referred to as hue, which can be understood to mean that which is considered to be the "actual colour"), a colour intensity (i.e. how intense the colour looks, for example compared with a neutral grey, which is also referred to as saturation, colour saturation, colourfulness, chromaticity, or colour depth) and a brightness (i.e. how light or dark the colour looks).

In various exemplary embodiments the information regarding the hair colour may include, for example, a parameterisation in a known colour space, for example in a L*a*b colour space (wherein L* specifies the brightness of a colour, a* specifies the green and red component of the colour, and b* specifies the blue and yellow component of the colour; the shortened form Lab or, individually, L, a, or b will also be used herein at times) in an RGB colour space by colour components in red, green and blue, in a CMYK colour space by colour components in cyan, magenta, yellow and black, or in any other colour space.

As described above, the term "colour shade" may understood herein to mean the spectral colour impression of a colour, regardless of how this can be parameterised, for example as a point in a two-dimensional colour space (for example a*b* of the L*a*b* system) or a ratio of colour components (such as in the RGB colour space or in the CMYK colour space).

In various exemplary embodiments a colour space from which colour information (for example hair colour information of the dyed hair or of the hair prior to the colouring, which is also referred to as the base hair colour) originates or in which the colour information is displayed (for example if a hair colour is displayed; see below) can be such that a determined or displayed colour is independent of a medium by which the colour is determined or displayed (for example colour measuring device, screen, printer, scanner, human eye, etc.). The colour space may be, for example, an L*a*b* colour space, and the colour information may be a colour shade parameterised by employing a* and b*, for example. The uniform display in the medium-independent colour space may make it possible, for example, to display a colouring result that can be expected realistically, for example in that the colour impression attained by employing dyeing leaves behind the same colour impression for an observer of the dyed hair as shown in a presentation of the expected result, for example as a printed image on the packaging, a display on a computer screen, or the like.

A prediction of the aforementioned properties of hair colours, i.e. a determination of an expected colouring result, without having actually performed the dyeing process, may be more difficult when dyeing hair, that is to say when creating a hair colour, than in related fields of colour creation, for example photo printing, because, in the case of hair dyeing, it is not typically inks that are used, at least not directly, but instead dye precursors. During a dyeing process a large number of different dyes could then form, the properties of which as pure substances might not be known.

In order to determine expected hair colours for a (for example arbitrary) initial state and for a large number of combinations of concentrations of a plurality of dye precursors, methods from the field of predictive analytics can be used, in order to enable precise calculations of properties of the hair dyes, for example colour information, but also for example a washing fastness, a grey coverage and/or a light fastness, in spite of the many parameters.

In various exemplary embodiments the second initial state parameter is an initial hair colour of the hair that is to be dyed. The initial hair colour can be parameterised in a colour space, for example a Lab colour space, an RGB colour space, or the like.

In various exemplary embodiments a method that is easily carried out and a corresponding device are used. The device will be described in greater detail for example in FIG. 2 and the associated description. The device enables a precise determination of the initial hair colour, for example in a colour space, for example a L*a*b* colour space, an RGB colour space, or the like. The device for determining the initial hair colour for example comprises a lamp. The lamp emits a light in the visible range. The device for determining the initial hair colour also has, for example, a camera, for example a digital camera. For example, the device for determining the initial hair colour is one that determines a value for the initial hair colour corresponding to the results of stationary apparatuses with the following parameters: a D65 light source with diffuse lighting, for example by employing an Ulbricht sphere and at an angle of 8° inclusive of shine.

In various exemplary embodiments the initial colour state is determined for the hair region by summing the determination of the first initial state parameter and of the second initial state parameter for all partial areas of the hair region.

In various exemplary embodiments the computer-assisted determination of the attainable hair colouring result is performed by employing predictive analytics.

Predictive analytics can be described generally as a method for extracting information from large data volumes and for generating a model from these data, which model makes it possible to make predictions even for values that are not part of the dataset. When applying a predictive analytics method, part of the dataset may be used typically as a training dataset (also referred to as training set or training data). On the basis of this training data set one or more models can be produced which then can be tested on the basis of the data which are not part of the training dataset, on the basis of all of the data, or on the basis of a specially chosen portion of the data.

With the use of initial hair colour and prior hair damage data, a relationship can be determined between a plurality of dyeing precondition parameters and a hair colouring result by employing the predictive analytics. The plurality of dyeing precondition parameters may include a plurality of concentrations of dye precursors of a hair dye and the initial colour state of the hair region.

In various exemplary embodiments the computer-assisted determination of the attainable hair colouring result can be performed by employing a data processing device.

The data processing device may comprise a computer for example, or any other data processing device that is suitable for storing and providing data and for carrying out the predictive analytics method, that is to say for example any data processing device with a sufficiently large data memory and sufficiently powerful processor.

The data processing device may comprise, for example, a mobile data processing device, for example a smartphone, a tablet, a smart mirror, or a laptop, but also another computer, or any other data processing device which is suitable for storing and providing data, carrying out the comparison, and applying the model, and also creating the model if necessary, i.e. for example any data processing device with a sufficiently large data memory and sufficiently powerful processor.

In various exemplary embodiments the data processing device can comprise at least one input device for inputting information into the data processing device, for example for inputting cysteic acid content measured values for the calibration and, as applicable, for inputting instructions, parameters, etc. for carrying out the method.

In various exemplary embodiments the method also comprises a step of displaying the hair colouring result.

In various exemplary embodiments the data processing device may comprise at least one output device for outputting information, for example for outputting results of the method.

In various exemplary embodiments the at least one output device may comprise a screen and/or a printer.

Figure 2:
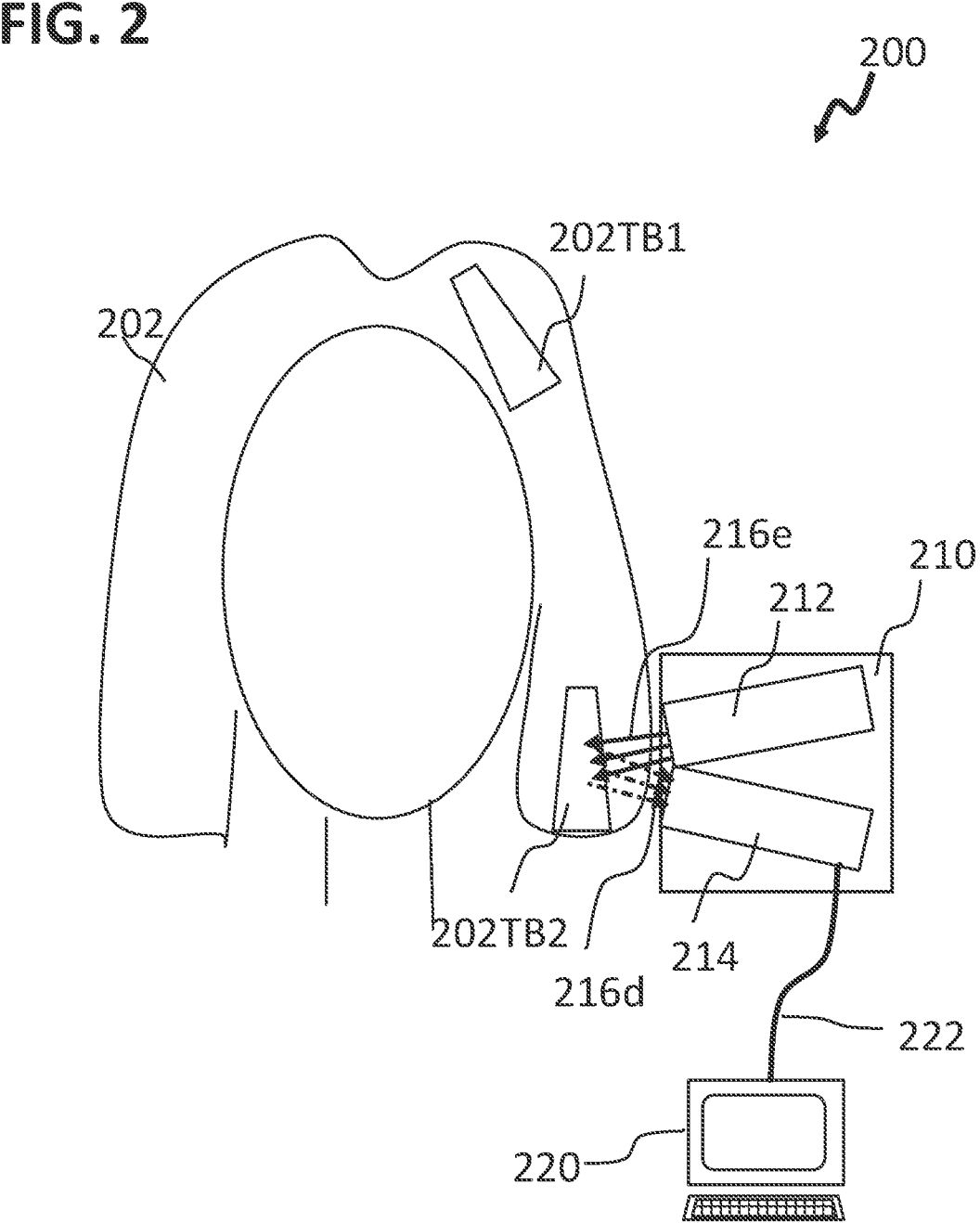
FIG. 2 shows a schematic illustration of a method and a device for determining a colouring result of a dye for dyeing hair in accordance with various exemplary embodiments.

FIG. 2 shows, in a view 200, a schematic illustration of a method and a device for determining a colouring result of a dye for dyeing hair in accordance with various exemplary embodiments.

In various exemplary embodiments a device 210 can be used to determine the colouring result of the dye for dyeing hair, as is shown schematically by way of example in FIG. 2 in a view 200.

In various exemplary embodiments the device 210 comprises a measuring device 210, which is designed to determine the value for the first initial state parameter and the value for the second initial state parameter for each partial area of the hair region of the hair that is to be dyed. The measuring device for example comprises an emission device 212 for emitting a signal, for example of light, and a detection device 214 for detecting the signal emitted by the emission device following interaction with the hair. For example, the emission device 212 emits light 216e with wavelengths in the visible NIR and/or IR range. The detection device 214 for example detects light 216e with wavelengths in the visible, NIR and/or IR range in accordance with the wavelength of the emitted light. The emission device 212 and the detection device 214 can be housed in a common housing. In other words: the emission device 212 and the detection device 214 for example form an integrated unit.

In various exemplary embodiments the device 210 comprises a data processing device, for example for carrying out the computer-assisted determination of the hair colouring result of the hair dye for dyeing hair. Here, the data processing device is designed for example in such a way as to carry out method described in FIG. 1 for determining a hair colouring result of a hair dye for dyeing hair.

In accordance with various exemplary embodiments a hair region 202 of a user may be examined in order to determine a colouring result produced by a dye for dyeing hair. The hair region 202 in this case comprises at least one first partial area 202TB1 and a second partial area 202TB2 arranged laterally next to the first partial area. The first partial area 202TB1 may be free or substantially free from overlap with the second partial area 202TB2. The first partial area 202TB1 is, for example, an area of the hair in the immediate vicinity of the scalp, for example at a certain distance from the scalp in the range of from a few millimetres to a few centimetres. The second partial area 202TB2 is, for example, a region of the hair which includes the tips of the hair. For example, the hair region 202 comprises a plurality of partial areas, wherein the sum of the partial areas comprises all of the hair of the user.

The term "partial area" within the scope of this description is used in the sense that it refers to an area of the hair, wherein the hairs in the partial area are substantially identical or homogeneous to one another in respect of the hair colour or hair state. In addition, the term "partial area" within the scope of this description is defined in conjunction with the area content of the area of the hair visible from the measuring device 210. In other words: The partial area of the hair region corresponds to the area of hair that is illuminated by the measuring device 210 by employing the visible, NIR and/or IR light 216e and with which the light 216e interacts, wherein the partial area is defined by the measuring device in such a way that the partial area includes hairs that have substantially the same hair colour and substantially the same hair state as one another. The partial area may have an area that lies for example in a range of from approximately 1 cm$^2$ to approximately 10 cm$^2$.

In various exemplary embodiments each partial area of the hair region is illuminated by a light emitted by the emission device 212. The light 216e is converted after interaction with the partial area into a light 216d to be analysed. The light to be analysed then enters the detection device 214.

In various exemplary embodiments the emission device 212 has a lamp that emits light with wavelengths in a spectral range of from about 200 nm to about 25,000 nm, preferably from about 200 nm to about 2,500 nm and very particularly preferably from about 380 to about 2,500 nm. The wavelengths in the spectral range of from about 380 nm to about 780 nm (visible light) are used for the determination of the initial hair colour. The wavelengths in the spectral range from about 780 nm to about 25,000 nm ((near-) infrared light) are used for the determination of the degree of prior damage. The lamp may have a single light source, which emits the light with wavelengths in the spectral range from about 380 nm to about 25,000 nm, preferably from about 380 nm to about 25,000 nm. Alternatively, the lamp may have two or more light sources, for example a first light source with an emittable light in the wavelength range of from about 380 nm to about 780 nm and a second light source with an emittable light in the wavelength range of from about 780 nm to about 25,000 nm, preferably from about 780 nm to about 25,000 nm. If the lamp has a plurality of light sources, the radiation of all light sources is directed to the same partial area. A light source may have a plurality of light source units, for example a plurality of (organic) light-emitting components (LED or OLED).

In various exemplary embodiments the detection device 214 has a spectrometer for recording at least part of the spectrum of NIR or IR light which has interacted with the partial area of the hair region. The detection device 214 also has a camera for example, such as a digital camera for recording at least part of the spectrum of the visible light which has interacted with the same partial area of the hair region as the NIR or IR light. The NIR/IR spectrometer and the camera can be arranged in immediate vicinity. For example, the NIR/IR spectrometer and the camera are arranged in such a way that the NIR/IR spectrometer and the camera detect the same part of light 216*d* to be analysed.

Alternatively, a UV/VIS spectral photometer may be used instead of a camera to determine a hair colour.

The measuring device 210 is suitable for performing the measurements or the determination of the first initial state parameter and the second initial state parameter simultaneously for the same partial area. For example, the measuring device 210 has two optical measurement systems (two emission devices and two detection devices), i.e. a first optical measuring system for determining the first initial state parameter and a second optical measuring system for determining the second initial state parameter. The two optical measuring systems are focussed on the same partial area. For example, the orientation of the optical axis of the first optical measuring system and the orientation of the optical axis of the second optical measuring system are such that the same partial area is analysed.

In various exemplary embodiments the spectrum of visible, NIR or IR light can be transmitted to a data processing device 220. The transmission is denoted by the reference sign 222. The transmission can be performed in a known way, for example by employing a data cable or wireless data transmission (for example Bluetooth, WLAN, Thread, Zig-Bee or Near Field Communication (NFC)), or a transmission can be performed within a device, if the measuring device, i.e. the spectrometer and the camera (and as applicable the lamp) is part of a data processing device 220 or the measuring device 210 is formed with an integrated data processing device 220.

In various exemplary embodiments the data processing device 220 is a smartphone, a tablet, a smart mirror, or a laptop or another computer, or comprises same.

In order to receive and further process the data and for the model formation, the data processing device 220 may be equipped in various exemplary embodiments with an appropriate software, for example an app.

In various exemplary embodiments the data processing device may comprise at least one output device for outputting information, for example for outputting results of the method.

In various exemplary embodiments the at least one output device may comprise a screen and/or a printer.

FIG. 3 shows a flow chart showing a method for determining a colouring result for dyeing hair to a desired hair colour in accordance with various exemplary embodiments.

The method 300 consists in determining 310, for each partial area of a hair region of hair to be dyed, a value for a first initial state parameter and a value for a second initial state parameter in the particular partial area. The first initial state parameter includes information regarding a hair state. The second initial state parameter again includes information regarding a hair colour. The first initial state parameter and the second initial state parameter describe an initial colour state of the hair to be dyed in the partial area. The method 300 further consists in determining 320 the initial colour state of the hair to be dyed for the hair region. The method 300 also consists in producing 330 a plurality of hair colouring results by computer-assisted determination, for each hair dye from a plurality of hair dyes, or a predicted hair colouring result of the hair region under consideration of the determined initial colouring state of the hair in the hair region. The method 300 also comprises a comparison 340 of each determined hair colouring result from the plurality of hair colouring results with the desired hair colour, and a choice 350 of a hair dye from the hair dyes for dyeing hair on the basis of the determined hair colouring results under consideration of the comparison. The method for specifying the dye for colouring hair in a desired hair colour may include the above-described fundamental features and operating principles of the method described in FIG. 1 for determining a colouring result produced by a dye for dyeing hair. For example the steps of determining 310 a value for a first initial state parameter and a value for a second initial state parameter correspond to the determination 110 described in FIG. 1 of a value for a first initial state parameter and a value for a second initial state parameter, and the step of determining 320 the initial colour state corresponds to the determination 120 described in FIG. 1 of the initial colour state, or are/is performed substantially identically.

The step of generating 330 a plurality of hair colouring results by computer assisted determination, for each hair dye of a plurality of hair dyes, of a forecast hair colouring result is achieved for example by repeating, for a specific hair dye, the computer-assisted determination, described in FIG. 1, of a forecast hair colouring result on each hair dye of a plurality of hair dyes.

In various exemplary embodiments the comparison 340 of each determined hair colouring result from the produced plurality of hair colouring results includes a determination of a plurality of colour distances. Each colour distance from the plurality of colour distances is a colour distance between the desired hair colour and the determined hair colouring results for a hair dye from the plurality of hair dyes. The comparison 340 also comprises a determination of a minimum colour distance from the plurality of colour distances. Furthermore, the choice 350 of a hair dye includes a determination of the hair dye associated with the minimum colour distance as the hair dye for dyeing hair in the desired hair colour.

By employing the methods from the field of predictive analytics, it may now be possible to guarantee for a user (for example a consumer) a colouring result which is as close as possible to their desired hair colour (insofar as is chemically possible).

In various exemplary embodiments a desired hair colour may be chosen from the forecast hair colouring results.

The desired hair colour may be defined in different exemplary embodiments, for example by the user, in such a way that, after a presentation of the forecast hair colouring results, the user chooses the desired hair colour. The forecast hair colouring results may be presented for example by employing a display device, for example by employing a screen, for example a computer screen, or by employing another output device, for example they may be printed. The user, in different exemplary embodiments, may define the desired hair colour by inputting the choice into a data processing device, for example a computer. The input process may include any kind of input, for example the touching of a screen, the clicking on a screen region with a mouse cursor, the inputting of information by employing keypad, or voice control.

Once the user has chosen the desired hair colour, the user can also be informed, by visual display or by acoustic announcement, where the dye for attaining the chosen desired hair colour can be purchased. Additionally or alternatively, it may be possible for the user to place an online order, preferably by loading a website of the manufacturer of the dye for attaining the chosen desired hair colour.

Further advantageous embodiments of the method will become clear from the description of the device, and vice versa.

According to a first exemplary embodiment a method for determining a hair colouring result produced by a hair dye for dyeing hair may comprise:
  determining, for each partial area of a hair region of hair to be dyed, a value for a first initial state parameter and a value for a second initial state parameter in the particular partial area,
wherein the first initial state parameter includes information regarding a hair state, wherein the second initial state parameter includes information regarding a hair colour, and wherein the first initial state parameter and the second initial state parameter describe an initial colour state of the hair to be coloured in the partial area;
  determining the initial colour state of the hair to be coloured for the hair region;
  computer-assisted determination, for a particular hair dye, of a forecast hair colouring result for the hair in the hair region, taking into consideration the determined initial colour state of the hair in the hair region.

According to a second exemplary embodiment the method according to the first exemplary embodiment may be configured such that the first initial state parameter is a degree of prior damage to the hair that is to be dyed.

According to a third exemplary embodiment the method according to the first or second exemplary embodiment may be configured such that the second initial state parameter is a degree of prior damage to the hair that is to be dyed.

According to a fourth exemplary embodiment the method according to the third exemplary embodiment may be configured such that the determination of the degree of prior damage comprises:
  during the exposure of each partial area of the hair region to near-infrared and/or infrared light, recording, for each partial area, a spectrum of at least part of the near-infrared and/or infrared light which has interacted with each partial area of the hair region;
  comparing at least part of the spectrum with a spectroscopic calibration model obtained by employing near-infrared and/or infrared spectra and degrees of prior damage of a plurality of calibration hair samples; and
  determining the degree of prior damage for each partial area of the hair region of the hair that is to be coloured, under consideration of the aforesaid comparison.

According to a fifth exemplary embodiment the method according to any one of the first to fourth exemplary embodiments may be configured in such a way that the value for the first initial state parameter and the value for the second initial state parameter are determined by employing a common measuring device.

According to a sixth exemplary embodiment the method according to any one of the first to fourth exemplary embodiments the value for the first initial state parameter and the value for the second initial state parameter are determined by employing two measuring devices, which are situated in a common housing.

According to a seventh exemplary embodiment the method according to any one of the first to sixth exemplary embodiments may be configured in such a way that the computer-assisted determination of the forecast hair colouring result is performed by employing predictive analytics.

According to an eighth exemplary embodiment the method according to any one of the first to seventh exemplary embodiments may be configured in such a way that the method also includes displaying the hair colouring result.

According to a ninth exemplary embodiment a device for determining a hair colouring result produced by a hair dye for dyeing hair may comprise:
  a measuring device, which is designed to determine the value for the first initial state parameter and the value for the second initial state parameter for each partial area of the hair region of the hair that is to be dyed; and
  a data processing device for carrying out a computer-assisted determination of a hair colouring result of a hair dye for dyeing hair, wherein the data processing device is configured to carry out the method according to claim 1.

According to a tenth exemplary embodiment the device according to the ninth exemplary embodiment may be configured in such a way that the measuring device detects wavelengths in a spectral range of from about 200 nm to about 25,000 nm, preferably from about 200 nm to about 2,500 nm and more preferably from about 380 to about 2,500 nm.

According to an eleventh exemplary embodiment the device according to either one of the ninth to tenth may be configured in such a way that the measuring device comprises a digital camera and/or an NIR/IR spectrometer.

According to a twelfth exemplary embodiment the device according to either one of the ninth to tenth exemplary embodiments may be configured in such a way that the measuring device comprises a UV/VIS spectral photometer and/or an NIR/IR spectrometer.

According to a thirteenth exemplary embodiment the device according to one of the ninth to twelfth exemplary embodiments may be configured in such a way that the data processing device comprises a smartphone, a tablet or a laptop or another computer.

According to a fourteenth exemplary embodiment the device according to one of the eighth to thirteenth exemplary embodiments may be configured in such a way that the device also comprises an output device for outputting information.

According to a fifteenth exemplary embodiment a method for specifying a hair dye for dyeing hair in a desired hair colour may comprise:
  determining, for each partial area of a hair region of hair to be dyed, a value for a first initial state parameter and a value for a second initial state parameter in the particular partial area.
wherein the first initial state parameter includes information regarding a hair state, wherein the second initial state parameter includes information regarding a hair colour, and wherein the first initial state parameter and the second initial state parameter describe an initial colour state of the hair to be coloured in the partial area;
  determining the initial colour state of the hair to be coloured for the hair region;

The method also consists in producing a plurality of hair colouring results by computer-assisted determination, for each hair dye from a plurality of hair dyes, or a predicted hair colouring result of the hair region under consideration of the determined initial colouring state of the hair in the hair region.

comparing each determined hair colouring result of the produced plurality of hair colouring results with the desired hair colour;

choosing a hair dye from the hair dyes for dyeing hair on the basis of the determined hair colouring results on consideration of the comparison.

According to a sixteenth exemplary embodiment the method according to the fifteenth exemplary embodiment may be configured in such a way that the comparison of each determined hair colouring result from the plurality of hair colouring results comprise:

determining a plurality of colour distances, wherein each colour distance from the plurality of colour distances is a colour distance between the desired hair colour and the determined hair colouring results for a hair dye from the plurality of hair dyes;

determining a minimum colour distance from the plurality of colour distances; and wherein the choosing of a hair dye comprises:

determining the hair dye associated with the minimum colour distance as the hair dye for dyeing hair in the desired hair colour.

According to a seventeenth exemplary embodiment the method according to any one of the fourteenth to sixteenth exemplary embodiments may be configured in such a way that it also comprises:

providing information as to where a chosen dye may be purchased and/or enabling an online order to be placed for the chosen dye.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method for determining a hair colouring result produced by a hair dye for dyeing hair, the method comprising:

determining, for each partial area of a hair region of hair to be dyed, a value for a first initial state parameter and a value for a second initial state parameter in the particular partial area, wherein the first initial state parameter includes information regarding a hair state, wherein the second initial state parameter includes information regarding a hair colour, and wherein the first initial state parameter and the second initial state parameter describe an initial colour state of the hair to be dyed in the partial area;

determining the initial colour state of the hair to be coloured for the hair region;

computer-assisted determination, for a particular hair dye, of a forecast hair colouring result for the hair in the hair region, taking into consideration the determined initial colour state of the hair in the hair region, wherein the first initial state parameter is a degree of prior damage to the hair that is to be dyed and wherein the second initial state parameter is an initial hair colour of the hair that is to be dyed, and wherein determining the degree of prior damage comprises:

during exposure of each partial area of the hair region to near-infrared and/or infrared light, recording, for each partial area, a spectrum of at least part of the near-infrared and/or infrared light which has interacted with each partial area of the hair region;

comparing at least part of the spectrum with a spectroscopic calibration model obtained by means of near-infrared and/or infrared spectra and degrees of prior damage of a plurality of calibration hair samples; and determining the degree of prior damage for each partial area of the hair region of the hair that is to be coloured, under consideration of the aforesaid comparison.

2. The method according to claim 1,
wherein the value of the first initial state parameter and the value of the second initial state parameter are determined employing a common measuring device.

3. The method according to claim 1,
wherein the computer-assisted determination of the forecast hair colouring result is performed employing predictive analytics.

4. The method according to claim 1,
the method also comprising displaying the hair colouring result.

5. A device for determining a hair colouring result produced by a hair dye for dyeing hair, the device comprising:

a data processing device for carrying out a computer-assisted determination of a hair colouring result of a hair dye for dyeing hair, wherein the data processing device is configured to carry out the method according to claim 1; and a measuring device, which is designed to determine the value for the first initial state parameter and the value for the second initial state parameter for each partial area of the hair region of the hair that is to be dyed.

6. The device according to claim 5,
wherein the measuring device detects wavelengths in a spectral range of from about 200 nm to about 25,000 nm.

7. The device according to claim 5,
wherein the measuring device comprises a digital camera or an NIR/IR spectrometer.

8. The device according to claim 5,
wherein the measuring device comprises a UV/VIS spectral photometer or an NIR/IR spectrometer.

9. The device according to claim 5,
wherein the data processing device comprises a smartphone, a tablet, or a laptop, or another computer.

10. A method for specifying a hair dye for dyeing hair in a desired hair colour, the method comprising:

determining, for each partial area of a hair region of hair to be dyed, a value for a first initial state parameter and a value for a second initial state parameter in the particular partial area, wherein the first initial state parameter includes information regarding a hair state, wherein the second initial state parameter includes information regarding a hair color, and
wherein the first initial state parameter and the second initial state parameter describe an initial colour state of the hair to be dyed in the partial area;
  determining the initial colour state of the hair to be coloured for the hair region;
  producing a plurality of hair colouring results by computer-assisted determination, for each hair dye from a plurality of hair dyes, or a predicted hair colouring result of the hair region under consideration of the determined initial colouring state of the hair in the hair region,
  comparing each determined hair colouring result of the produced plurality of hair colouring results with the desired hair colour;
choosing a hair dye from the hair dyes for dyeing hair on the basis of the determined hair colouring results on consideration of the comparison, wherein the first initial state parameter is a degree of prior damage to the hair that is to be dyed and wherein the second initial state parameter is an initial hair colour of the hair that is to be dyed, and
wherein determining the degree of prior damage comprises:
  during exposure of each partial area of the hair region to near-infrared and/or infrared light, recording, for each partial area, a spectrum of at least part of the near-infrared and/or infrared light which has interacted with each partial area of the hair region;
  comparing at least part of the spectrum with a spectroscopic calibration model obtained by means of near-infrared and/or infrared spectra and degrees of prior damage of a plurality of calibration hair samples; and
  determining the degree of prior damage for each partial area of the hair region of the hair that is to be coloured, under consideration of the aforesaid comparison.

11. The method according to claim 10,
wherein comparing each determined hair colouring result from the plurality of hair colouring results comprises:
  determining a plurality of colour distances, wherein each colour distance from the plurality of colour distances is a colour distance between the desired hair colour and the determined hair colouring results for a hair dye from the plurality of hair dyes;
  determining a minimum colour distance from the plurality of colour distances; and wherein the choosing of a hair dye comprises:
  determining the hair dye associated with the minimum colour distance as the hair dye for dyeing hair in the desired hair colour.

12. The method according to claim 10, also comprising:
providing information as to where a chosen dye may be purchased and/or
enabling an online order to be placed for the chosen dye.

* * * * *